(12) United States Patent
Scheffer et al.

(10) Patent No.: US 9,443,523 B2
(45) Date of Patent: *Sep. 13, 2016

(54) MULTI-SAMPLE CONVERSATIONAL VOICE VERIFICATION

(71) Applicant: SRI INTERNATIONAL, Menlo Park, CA (US)

(72) Inventors: Nicolas Scheffer, San Francisco, CA (US); Yun Lei, Palo Alto, CA (US); Douglas A. Bercow, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,542

(22) Filed: Feb. 1, 2016

(65) Prior Publication Data

US 2016/0163320 A1    Jun. 9, 2016

Related U.S. Application Data

(63) Continuation of application No. 13/560,254, filed on Jul. 27, 2012, now Pat. No. 9,251,792.

(60) Provisional application No. 61/660,409, filed on Jun. 15, 2012.

(51) Int. Cl.
*G10L 15/00* (2013.01)
*G10L 17/00* (2013.01)
(Continued)

(52) U.S. Cl.
CPC ........... *G10L 17/24* (2013.01); *G06F 17/3053* (2013.01); *H04L 63/0861* (2013.01); *H04L 63/10* (2013.01)

(58) Field of Classification Search
None
See application file for complete search history.

(56) References Cited

U.S. PATENT DOCUMENTS 5,365,574 A * 11/1994 Hunt .................. G06F 21/32
                                                    379/189
5,893,057 A *  4/1999 Fujimoto ............. G10L 17/00
                                                    704/246

(Continued)

FOREIGN PATENT DOCUMENTS

EP    WO9954868 A1    10/1999
EP    1202228 A1 *   10/2001 ............... G07F 7/10

(Continued)

OTHER PUBLICATIONS

Ming-Cheung Cheung, Man-Wai Mak and Sun-Yuan Kung, "Multi-sample data-dependent fusion of sorted score sequences for biometric verification," Acoustics, Speech, and Signal Processing, 2004. Proceedings. (ICASSP '04). IEEE International Conference on, 2004, pp. V-681-V-684 vol. 5.*

(Continued)

*Primary Examiner* — Richemond Dorvil
*Assistant Examiner* — Thuykhanh Le
(74) *Attorney, Agent, or Firm* — McCarter & English, LLP; Kia L. Freeman, Esq.

(57) ABSTRACT

A system and method of verifying the identity of an authorized user in an authorized user group for enabling secure access to one or more services via a device includes receiving first voice information from a speaker through the device, calculating a confidence score based on a comparison of the first voice information with a stored voice model associated with the authorized user and specific to the authorized user, interpreting the first voice information as a specific service request, identifying a minimum confidence score for initiating the specific service request, determining whether or not the confidence score exceeds the minimum confidence score, and initiating the specific service request if the confidence score exceeds the minimum confidence score.

18 Claims, 6 Drawing Sheets

(51) Int. Cl.
  *G10L 17/24* (2013.01)
  *H04L 29/06* (2006.01)
  *G06F 17/30* (2006.01)

(56) References Cited

U.S. PATENT DOCUMENTS

| | | | |
|---|---|---|---|
| 6,182,037 B1 | 1/2001 | Maes | |
| 6,496,800 B1 | 12/2002 | Kong et al. | |
| 6,529,871 B1 * | 3/2003 | Kanevsky | G10L 17/24 |
| | | | 379/88.02 |
| 6,529,881 B2 * | 3/2003 | Morganstein | G06Q 20/206 |
| | | | 704/251 |
| 6,973,426 B1 | 12/2005 | Schier et al. | |
| 7,409,343 B2 | 8/2008 | Charlet | |
| 7,630,895 B2 | 12/2009 | Bossemeyer, Jr. et al. | |
| 7,657,432 B2 | 2/2010 | Chaudhari et al. | |
| 7,933,774 B1 * | 4/2011 | Begeja | G10L 15/063 |
| | | | 704/231 |
| 7,940,897 B2 * | 5/2011 | Khor | G06Q 30/02 |
| | | | 379/88.02 |
| 8,010,367 B2 | 8/2011 | Muschett et al. | |
| 8,036,892 B2 * | 10/2011 | Broman | G06Q 20/341 |
| | | | 704/246 |
| 8,185,392 B1 * | 5/2012 | Strope | G10L 15/01 |
| | | | 704/231 |
| 2002/0161647 A1 * | 10/2002 | Gailey | G06F 17/30867 |
| | | | 705/14.23 |
| 2003/0088414 A1 | 5/2003 | Huang | |
| 2003/0130844 A1 * | 7/2003 | Chaudhari | G10L 17/12 |
| | | | 704/240 |
| 2004/0107099 A1 * | 6/2004 | Charlet | G10L 17/12 |
| | | | 704/234 |
| 2005/0063522 A1 | 3/2005 | Kim | |
| 2006/0161435 A1 * | 7/2006 | Atef | G06F 21/31 |
| | | | 704/246 |
| 2006/0188076 A1 * | 8/2006 | Isenberg | H04M 3/385 |
| | | | 379/88.02 |
| 2008/0059167 A1 * | 3/2008 | Poultney | G10L 15/07 |
| | | | 704/231 |
| 2008/0247519 A1 * | 10/2008 | Abella | G10L 15/22 |
| | | | 379/88.04 |
| 2008/0273674 A1 * | 11/2008 | Clelland | G10L 15/22 |
| | | | 379/88.04 |
| 2009/0116447 A1 * | 5/2009 | Balasubramanian | H04W 36/14 |
| | | | 370/331 |
| 2009/0319274 A1 * | 12/2009 | Gross | G10L 17/26 |
| | | | 704/260 |
| 2010/0027767 A1 * | 2/2010 | Gilbert | H04M 3/42221 |
| | | | 379/88.03 |
| 2010/0106502 A1 | 4/2010 | Farrell et al. | |
| 2010/0106503 A1 | 4/2010 | Farrell et al. | |
| 2010/0179813 A1 | 7/2010 | Summerfield | |
| 2010/0204993 A1 | 8/2010 | Vogt | |
| 2011/0082874 A1 | 4/2011 | Gainsboro | |
| 2011/0224986 A1 * | 9/2011 | Summerfield | G10L 17/12 |
| | | | 704/246 |
| 2011/0276447 A1 * | 11/2011 | Paul | G06Q 30/02 |
| | | | 705/34 |
| 2012/0016673 A1 | 1/2012 | Das | |
| 2012/0059715 A1 * | 3/2012 | Timmins | G06Q 30/0251 |
| | | | 705/14.49 |

FOREIGN PATENT DOCUMENTS

| | | |
|---|---|---|
| EP | 1202228 A1 | 5/2002 |
| EP | 1399915 B1 | 3/2009 |
| WO | WO8700332 A1 | 1/1987 |
| WO | WO0116940 A1 | 3/2001 |

OTHER PUBLICATIONS

Nuance Communications, Inc., "Nuance FreeSpeech 8.2: Product Description" (2012) retrieved from <http://www.nuance.com/ucmprod/groups/enterprise/@web-enus/documents/collateral/nc_015224.pdf>.

Ming-Cheung Cheung, Man-Wai Mak, and Sun-Yuan Kung, Multi-Sample Data-Dependent Fusion of Sorted Score Sequences for Biometric Verification (undated) retrieved from <http://citeseerx.ist.psu.edu/viewdoc/download?doi=10.1.1.10.3673&rep=rep1&type=pdf>.

* cited by examiner

Example 1 (successful verification with 1st sample):

| User Utterance | Confidence Score | Result |
|---|---|---|
| "Get directions to 333 Ravenswood Avenue, Menlo Park, California from here." | | |
| | Confidence score exceeds minimum confidence score | |
| | | "Here are directions." [Google map on screen] |

Example 2 (two samples required for successful verification):

| User Utterance | Confidence Score | Result |
|---|---|---|
| "Get directions to 333 Ravenswood Avenue, Menlo Park, California from here." | | |
| | Confidence score does not exceed minimum confidence score | |
| | | "What route do you prefer, fastest possible route or shortest traveling distance?" |
| "Shortest traveling distance." | | |
| | Confidence score exceeds minimum confidence score | |
| | | "Here are directions." [Google map on screen] |

Example 3 (three samples required for successful verification):

| User Utterance | Confidence Score | Result |
|---|---|---|
| "Send a text message to 650-543-6789: 'I'm stuck in traffic, I should be there by 5:30.'" | | |
| | Confidence score does not exceed minimum confidence score | |
| | | "What is the recipient's name?" |
| "John Smith." | | |
| | Confidence score does not exceed minimum confidence score | |
| | | "Is John Smith in one of your social networks?" |
| "He's a friend on Facebook." | | |
| | Confidence score exceeds minimum confidence score | |
| | | "OK, thanks. "Here is your text message to John Smith, should I send it now?" |
| "Yes." | | |
| | | [text message is sent] |

FIG. 4

MULTI-SAMPLE CONVERSATIONAL VOICE VERIFICATION

RELATED APPLICATIONS

A claim of priority is made to U.S. Provisional Patent Application Ser. No. 61/660,409, entitled "MULTI-SAMPLE CONVERSATIONAL VOICE VERIFICATION," which was filed on Jun. 15, 2012, and to U.S. patent application Ser. No. 13/560,254, also entitled "MULTI-SAMPLE CONVERSATIONAL VOICE VERIFICATION," which was filed on Jul. 27, 2012, both of which are hereby incorporated by reference in their entirety.

BACKGROUND

1. Field of Invention

Embodiments relate generally to voice verification, and more particularly, to systems and methods of verifying the identity of an authorized user for enabling secure access to information or data services via a device.

2. Description of Related Art

Some conventional computing systems accept user-entered identifying information, such as a password or a Personal Identification Number (PIN), for verifying the identity of an authorized user before permitting the user to access certain secured data or functions in or through the computer system. For example, the user may type the identifying information on a keyboard of a personal computer or a touch screen of a mobile computing device, such as a cell phone. These techniques require the user to touch or otherwise mechanically manipulate the input device as the information is entered, preventing hands-free operation. Increasingly, however, hands-free operation is desirable, particularly for mobile applications as a matter of convenience and other purposes, such as compliance with various motor vehicle laws restricting the use of mobile devices.

Some conventional hands-free technologies use the human voice as a form of input. Voice verification technology has been used for identifying an individual based on a model of the individual's voice. Such a technique is premised on the fact that each human voice is different, akin to a fingerprint, providing a mechanism for verifying the identity of a known individual using his or her voice. Voice verification takes, as an input, spoken words and compares them with a voice model that is uniquely associated with the individual. A confidence score represents the probability that the speaking voice matches the enrolled voice samples of the individual(s) used to create the model. The results of the comparison may be used to identify and/or verify the identity of the person who is speaking. However, voice verification has had limited application for securing access to information and data in mobile devices partly because of the encumbrances associated with known voice enrollment techniques (e.g., including requiring the user to perform a special procedure for enrolling their voice into the system). Furthermore, voice verification has been known to perform better when multiple voice samples are collected from a speaker over a period of time. Additionally, known voice verification techniques do not work well in situations where multiple users use the same device because such techniques are often limited to recognizing the voice of only one user.

SUMMARY

Various embodiments are directed to systems and methods of verifying the identity of an authorized user to enable secure access to information or data services on a device.

In one aspect, a method of verifying the identity of an authorized user in an authorized user group for enabling secure access to one or more services via a device comprises receiving first voice information from a speaker through the device. A confidence score is calculated, by at least one processor, based on a comparison of the first voice information with a stored voice model associated with the authorized user group and specific to the authorized user. The at least one processor is included in at least one of the device and a server operatively coupled to the device through a communication network. The first voice information is interpreted, by the at least one processor, as a specific service request. After a minimum confidence score for initiating the specific service request is identified, it is determined whether of not the confidence score exceeds the minimum confidence score. If the confidence score exceeds the minimum score, the specific service request is initiated. Otherwise, second voice information is obtained from the speaker, a confidence score is calculated based on a comparison of a combination of the first voice information and the second voice information with the stored voice model associated with the authorized user group and specific to the authorized user, and the determining step is repeated.

In some embodiments, the method may include constructing the stored voice model based on voice information representing a set of service requests spoken by the speaker prior to receiving the first voice information. In some embodiments, the method may include updating the stored voice model based on the first voice information. In some embodiments, the method may include storing, in the device, a plurality of minimum confidence scores each corresponding to a type of service request.

In some embodiments, the method may include prompting the speaker for the second voice information, using the device, if the confidence score does not exceed the minimum confidence score. In some embodiments, the prompting may include prompting the speaker to speak specific words based on the specific service request. In some embodiments, the prompting may include looking up, in a database, options related to fulfillment of a type of service corresponding to the specific service request, and constructing the prompt based on at least one of the options. In some embodiments, the method may include interpreting the second voice information as additional information related to the specific service request.

In some embodiments, the method may include denying access to the device if the confidence score does not exceed the minimum confidence score. In some embodiments, the method may include denying access to the device if the confidence score does not exceed the minimum confidence score after receiving a predetermined amount of voice information from the speaker.

In another aspect, a system for verifying the identity of an authorized user in an authorized user group for enabling secure access to one or more services via a device comprises at least one processor and a memory coupled to the at least one processor. The at least one processor is included in the device and/or a server operatively coupled to the device through a communication network. The device is operatively coupled to the at least one processor and configured to receive voice information from a speaker. The memory includes computer-executable instructions that when executed by the at least one processor cause the at least one processor to receive first voice information from a speaker through the device, calculate a confidence score based on a comparison of the first voice information with a stored voice model associated with the authorized user group and specific to the authorized user, interpret the first voice information as a specific service request, identify a minimum confidence score for initiating the specific service request, and determine whether or not the confidence score exceeds the minimum confidence score. If the confidence score exceeds the minimum confidence score, the computer-executable instructions when executed by the at least one processor cause the at least one processor to initiate the specific service request. Otherwise, the computer-executable instructions when executed by the at least one processor cause the at least one processor to obtain second voice information from the speaker, calculate a confidence score based on a comparison of a combination of the first voice information and the second voice information with the stored voice model associated with the authorized user group and specific to the authorized user, and repeat the determining step.

In some embodiments, the memory further may include computer-executable instructions that when executed by the at least one processor cause the at least one processor to construct the stored voice model based on voice information representing a set of service requests spoken by the speaker prior to receiving the first voice information. In some embodiments, the memory may further include computer-executable instructions that when executed by the at least one processor cause the at least one processor to update the stored voice model based on the first voice information.

In some embodiments, the memory may further include computer-executable instructions that when executed by the at least one processor cause the at least one processor to prompt the speaker for the second voice information if the confidence score does not exceed the minimum confidence score. In some embodiments, the memory may further include computer-executable instructions that when executed by the at least one processor cause the at least one processor to interpret the second voice information as additional information related to the specific service request.

In another aspect, a non-transitory computer-readable medium has stored thereon computer-executable instructions that when executed by at least one processor cause the at least one processor to receive first voice information from a speaker through a device, and calculate a confidence score based on a comparison of the first voice information with a stored voice model associated with an authorized user group and specific to an authorized user in the authorized user group. When executed by at least one processor, the computer-executable instructions further cause the at least one processor to interpret the first voice information as a specific service request, identify a minimum confidence score for initiating the specific service request, and determine whether or not the confidence score exceeds the minimum confidence score. If the confidence score exceeds the minimum confidence score, the computer-executable instructions cause the at least one processor to initiate the specific service request. Otherwise, the computer-executable instructions further cause the at least one processor to obtain second voice information from the speaker, calculate a confidence score based on a comparison of a combination of the first voice information and the second voice information with the stored voice model associated with the authorized user group and specific to the authorized user, and repeat the determining step.

In some embodiments, the non-transitory computer-readable medium may further include computer-executable instructions that when executed by the at least one processor cause the at least one processor to construct the stored voice model based on voice information representing a set of service requests spoken by the speaker prior to receiving the first voice information, and update the stored voice model based on the first voice information.

In some embodiments, the non-transitory computer-readable medium may further include computer-executable instructions that when executed by the at least one processor cause the at least one processor to prompt the speaker for the second voice information if the confidence score does not exceed the minimum confidence score. In some embodiments, the non-transitory computer-readable medium may further include computer-executable instructions that when executed by the at least one processor cause the at least one processor to interpret the second voice information as additional information related to the specific service request.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4 is a chart depicting several examples of a user interaction with systems and methods of verifying the identity of an authorized user, in accordance with several embodiments;

DETAILED DESCRIPTION

Figure 1:
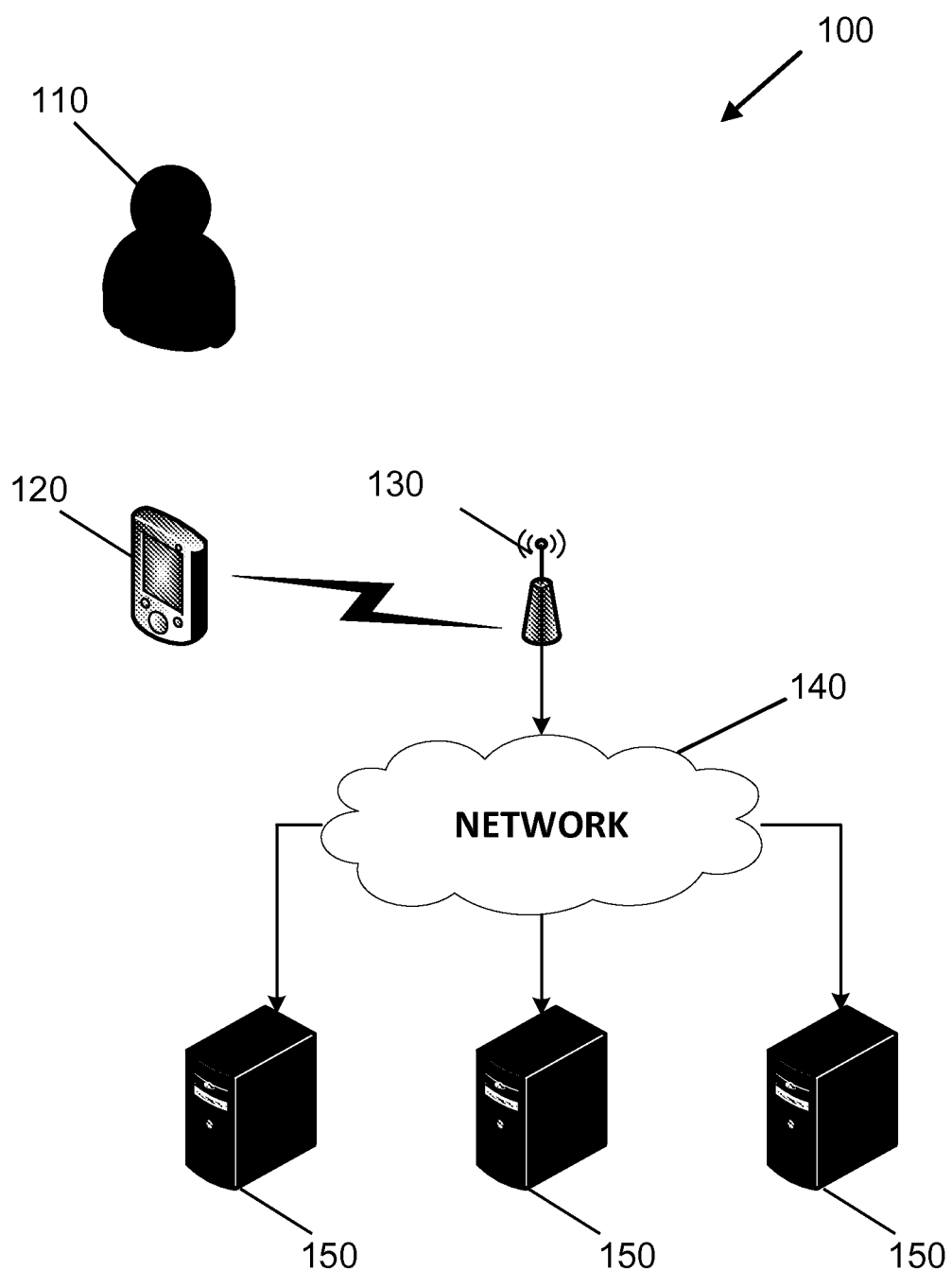
FIG. 1 is a block diagram depicting one example of an overview of a system for verifying the identity of an authorized user through a voice user interface, in accordance with one embodiment.

Embodiments are directed to personalized and secure access to one or more services using voice verification. In one embodiment, when a user speaks to a voice user interface (e.g., a natural language voice interface) of a computing device, such as a smart phone, personal digital assistant, tablet computer, or other mobile device, the resulting voice information, which may include any utterance including, but not limited to words, is sent to a voice verification system. The voice verification system interprets the voice information as a specific service request, and identifies a minimum confidence score for initiating the specific service request. The voice verification system also compares the voice information with a voice model associated with the authorized user group and specific to an authorized user in the authorized user group. In some embodiments, the voice model may be derived by the verification system from a collection of voice information previously received from the authorized user during interactions with the voice user interface. A confidence score, which reflects how similar the voice information is to the voice model, may be obtained from the comparison. If the confidence score exceeds a minimum threshold, the speaker is verified as the authorized user, and the specific service request is initiated.

In some instances, the minimum threshold may not be exceeded because the speaker may only have provided a small amount of voice information, e.g., by speaking few words or speaking for one or two seconds. Thus, if the confidence score does not exceed the minimum threshold, the voice verification system obtains additional voice information from the speaker through the voice user interface. In some embodiments, the voice verification system may obtain additional voice information from the speaker by prompting the speaker for additional input. In other embodiments, the voice verification system may obtain additional voice information from the speaker by simply waiting a reasonable time for the additional input from the voice user interface.

So as to maximize the voice information available for comparison to the voice model, the second or additional voice information may be combined (e.g., concatenated) with the first voice information. The combined voice information may be re-tested against the voice model, and a new or updated confidence score based on the combined samples may be derived. Accordingly, with the additional voice information, the voice verification system may calculate a confidence score based on a comparison of the combination of the original and additional voice information with the stored voice model associated with the authorized user group and specific to the authorized user; and again determine whether the confidence score exceeds the minimum threshold.

If the voice verification system still does not derive a score that exceeds the threshold, then the foregoing process may be repeated a one or more additional times. After receiving some amount of voice information, however, there may be sufficient available information that the system can either verify the speaker's identity, or else reasonably conclude that the speaker is not one of the authorized users in the authorized user group, in which case the specific service request is not initiated. Access to the one or more services may also be more generally denied.

It will be appreciated by those of skill in the art that, when the authorized user group includes only one user, there will be only one voice model associated with the group. When the authorized user group includes two authorized users, there will be two voice models associated with the group—a first voice model specific to the first authorized and a second voice model specific to the second authorized user. Similarly, when the authorized user group includes three authorized users, there will be three voice models associated with the group—each model specific one of the three authorized users. The voice information obtained from a speaker must be compared to each voice model associated with the authorized user group. For example, the voice information obtained from a speaker need only be compared to the single voice model when the authorized user group only includes a single authorized user.

The voice recognition according to various embodiments is useful for many applications, including mobile devices, because it provides a natural and intuitive way of controlling the device while allowing the user's hands to remain free. As many mobile devices now contain microphones and audio processing circuitry, it is possible to configure such devices to accept voice inputs for a variety of purposes, including user identification and verification. In some embodiments, user verification using spoken, natural language interfaces may be seamless to the user, fast, and perform with high accuracy using brief voice samples.

FIG. 1 is a block diagram depicting an overview of an environment 100 in which one or more embodiments may be practiced. The environment 100 includes one or more users 110, one or more user mobile devices 120, one or more wireless network interfaces 130, a communication network 140, and one or more servers 150 or other devices configured to provide one or more services, such as information and data services, to a user 110. Each user device 120 and server 150 may be wirelessly interconnected to share and exchange data through the network 140, which may include servers, databases, routers, switches, intranets, the Internet, and other computing and networking components and resources. Network link(s) between the user device 120 and the servers 150, including the wireless network interface 130, may include any arrangement of interconnected networks including both wired and wireless networks. For example, a wireless communication network link over which the user device 120 communicates may utilize a cellular-based communication infrastructure that includes cellular-based communication protocols such as AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others. In various embodiments, the network links may include wireless technologies including WLAN, WiFi®, WiMAX, Wide Area Networks (WANs), and Bluetooth®.

The user device 120 may include any mobile computing device (e.g., smart phone, tablet computer, or personal digital assistant) that is configured to connect directly or indirectly to the network 140 and/or the servers 150. Examples of user devices include a smartphone (e.g., the iPhone® manufactured by Apple Inc. of Cupertino, Calif., BlackBerry® manufactured by Research in Motion (RIM) of Waterloo, Ontario, any device using the Android® operating system by Google, Inc. of Mountain View, Calif., or any device using the Windows Mobile® operating system by Microsoft Corp. of Redmond, Wash.), a personal digital assistant, or other multimedia device, such as the iPad® manufactured by Apple Inc. The user device 120 may connect to other components (e.g., the servers 150) over a wireless network, such as provided by any suitable cellular carrier or network service provider (e.g., Sprint PCS, T-Mobile, Verizon, AT&T, etc.), or via a WiFi® connection to a data communication network. Each user device 120 may have one associated authorized user group including one or more authorized users 110. The mobile device 120 may be configured with information specific to its authorized user group and/or one or more of the authorized users 110 in the group, such as a name, username, password, identification number or other identifying data.

When a user speaks to a voice user interface (e.g., a natural language voice interface) of a computing device, such as a smart phone, personal digital assistant, tablet computer, or other mobile device, the resulting voice information, which may include any utterance including, but not limited to words, is sent to a voice verification system.

The user device 120 may include a microphone (not shown) or other audio input for receiving the utterances from the user 110. When the user 110 speaks, the user device 120 receives the sound the user makes via the microphone or audio input. Sounds made by the user 110 and received by the user device 120 may be collectively referred to herein as an utterance. For example, an utterance may include a spoken command, such as "call John at home," "send a text message to 650-555-6789," or "get directions to 333 Ravenswood Avenue in Menlo Park, Calif. from here." In some embodiments, the user device 120 includes a voice user interface for processing the utterance (e.g., such processing including, but not limited to, voice recognition and/or verification). In other embodiments, the user device 120 is configured to communicate data representing the utterance to a remote system, such as the server 150, for processing by the remote system. The data representing the utterance may be called voice information.

Figure 2:
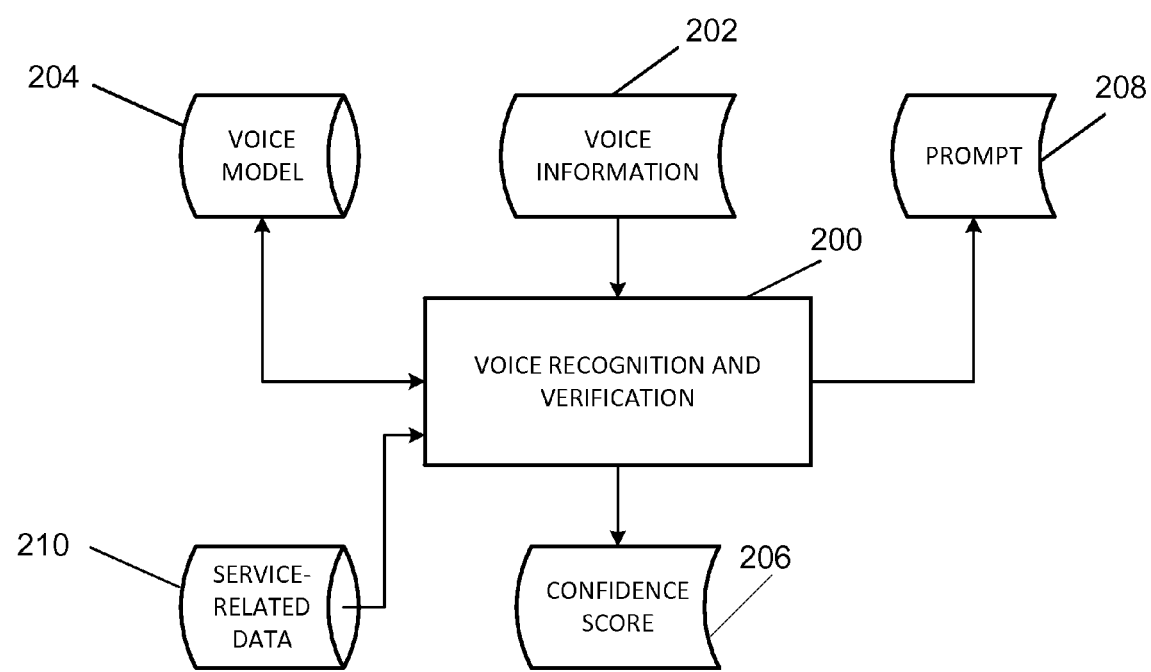
FIG. 2 is a data flow diagram depicting one example of a voice recognition and verification system, in accordance with one embodiment.

FIG. 2 is a data flow diagram depicting one example of a voice recognition and verification system 200, according to one embodiment. The voice recognition and verification system 200 may be included in the user device 120, on the server 150, and/or on another remote system. As discussed above, the user device 120 may receive as an input one or more utterances from the user 110 and convert it to voice information 202. Data representing each utterance is sent to the voice recognition and verification system 200. The system 200 receives the voice information 202 and compares it against a voice model 204 stored, for example, in a database or memory of the user device 110 and/or server 150. When the authorized user group associated with the user device 120 includes more than one authorized user, system 200 will have more than one voice model 204. The voice model 204 may be derived by the system 200 during a voice enrollment mode of operation from one or more utterances previously made by the user 110 during usual interactions with the system. For example, the voice model 204 may be constructed based on utterances made in the normal course of operating the device, with or without specifically asking the user 110 to provide sample utterances. In some embodiments, while operating in the enrollment mode, the user whose voice is received by the system 200 may be presumed to be an authorized user for establishing security measures, such as for restricting access to data or information services. In other embodiments, while operating in the enrollment mode, the identity of the user 110 may be established in other ways, such as by requiring a user-specific password or PIN code to be provided. User enrollment, and construction of the voice model, thus may take place transparently to the user 110 during normal usage the user device 120.

As described below with respect to FIG. 3, the voice recognition and verification system 200 may calculate a confidence score 206 by comparing the voice information 202 with the voice model 204 to determine whether the user 110 is an authorized user. The confidence score 206 may represent a probability that the voice information 202 matches the voice model 204. In some embodiments, the system 200 computes a threshold score for comparison with the confidence score 206. For example, the threshold score may be derived from a database of service-related data 210, which defines a minimum confidence score for the user 110 to access to the user device 120 and/or one or more services via the user device. In some embodiments, a plurality of minimum confidence levels are defined and stored, each corresponding to a type of service request. If the confidence score exceeds a target threshold (e.g., a minimum confidence score), then the identity of the user 110 may be deemed to be verified, and the specific service request may be initiated. The user may also be granted more general access to the user device 110 and/or services available through the user device 110 depending on the confidence score. If the confidence score does not exceed the target threshold, then the identity of the user 110 is not deemed to be verified, and the specific service request is not initiated.

In some embodiments, if the confidence score 206 does not meet the threshold, the system 200 may obtain additional voice samples from the user 110, e.g., by providing a visual, textual and/or audible prompt 208 to user for additional spoken input, and/or by waiting for the user to speak again on his or her own initiative. As mentioned above, individual utterances may provide little voice information. Thus, the additional voice information 202 may be combined (e.g., concatenated) with one or more previously obtained voice samples so as to enlarge the available voice information. The combined voice information may be re-tested against the voice model 204, and a new or updated confidence score 206 based on the combined voice samples may be calculated. If the confidence score 210 still fails to meet the target threshold for verifying the identity of the user 110, then the system 200 may process one or more additional voice samples in further attempts to verify the user's identity. After some pre-determined number of attempts, or a pre-determined length or duration of the combined samples, there may be sufficient information for the system 200 to either verify that the user 110 is an authorized user, or else reasonably conclude that the person speaking is not an authorized user, in which case more general access to the user device 110 and/or service available through the user device 110 may be denied.

In some embodiments, prompting the user for additional spoken input includes referencing options relevant to fulfillment of the requested service. In other embodiments, prompting the user for additional spoken input includes prompting the user for specific (e.g., randomly selected) spoken words to ensure that a user attempting to gain access using a pre-recorded voice is denied such access. In yet other embodiments, as noted above, additional voice samples may be collected from the user without additional prompting, and instead by simply analyzing any further voice input that the user subsequently provides. In some embodiments, spoken input is accumulated for verification purposes only within a limited time window, regarded by the system as a single verification session. In some embodiments, the system 200 may consider factors other than or in addition to time, such as location of the device (e.g., based on the Global Positioning System), the nature of the services being accessed, and/or other factors to decide if the additional spoken input continues to fall within a single interaction session and should still be accumulated and combined with the earlier input in an attempt to improve the confidence score.

Figure 3:
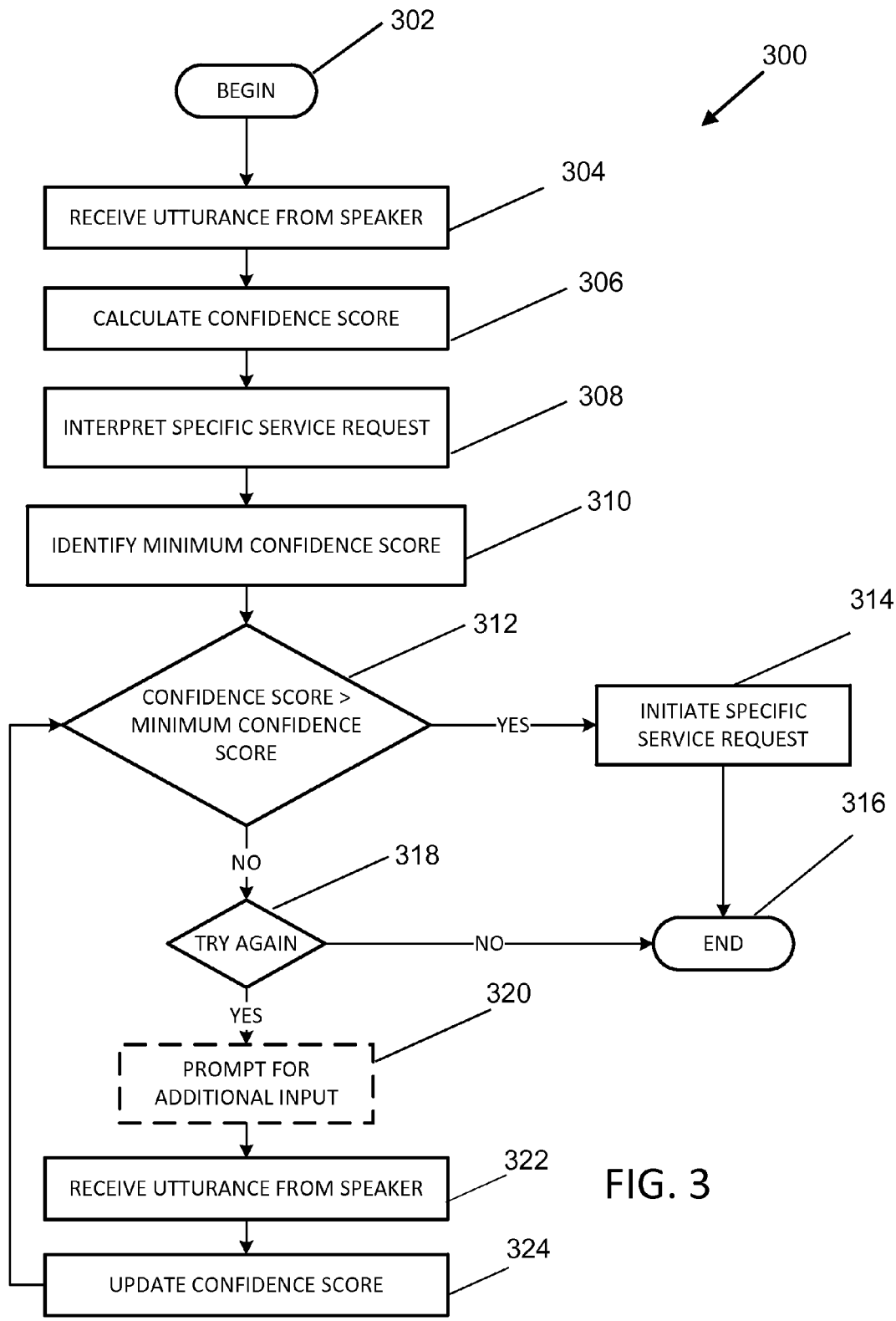
FIG. 3 is a flow diagram of one example of a process for verifying the identity of an authorized user through a voice user interface, in accordance with one embodiment.

FIG. 3 is a flow diagram of one example of a process 300 of verifying the identity of an authorized user using voice recognition, according to one embodiment. Process 300 may be implemented, for example, in the voice recognition and verification system 200 of FIG. 2, which may in turn be implemented in the user device 120 and/or one or more of the servers 150 of FIG. 1. Process 300 begins at block 302. At block 304, an utterance, or first voice information, is received from a speaker (i.e., the user 110) through a specific user device 120. The first voice information may include information about the specific user device that enables the associated group of authorized users to be identified. At block 306, a confidence score (e.g., the confidence score 206 of FIG. 2) may be calculated based on a comparison of the utterance against a voice model (e.g., the voice model 204 of FIG. 2) associated with the authorized user group. As discussed above, the voice model may be derived from one or more sample utterances received from one or more authorized users, and when compared with the utterance, the voice model may provide a probability, or level of confidence, that that the speaker is an authorized user.

At block 308, the voice information from the received utterance is interpreted as a specific service request. For example, the voice information may be processed by a voice recognition algorithm to interpret the voice information as a specific command or service request. For instance, if the voice information is interpreted to include the phrase "get directions to 333 Ravenswood Avenue in Menlo Park, Calif. from here," the specific service request may include a request to receive directions using an electronic map or navigation application or service. In another example, if the voice information is interpreted to include the phrase "unlock phone," the specific service request may include a command to unlock access to the user device 120. Several other examples of such commands or requests are described with respect to FIGS. 1 and 4.

At block 310, a minimum confidence score is identified as a threshold to be used for comparison with the calculated confidence score. The minimum confidence score may, for example, reflect the lowest acceptable level of confidence that the utterance was spoken by one of the authorized users for granting access to a secure device or service. The minimum confidence score may vary depending on the nature of the specific service request. For example, if the specific service request includes a request to unlock the user device 120, the minimum confidence score may be relatively high if the security settings of the user device are high. Likewise, the minimum confidence score may be relatively low if the service being requested is assigned a low security level. In another embodiment, the minimum confidence score may be fixed or identified with or without respect to the specific service request and/or with respect to other factors, such as the language spoken by the user, the quality of the received sound, the time of day, the location of the user device 120, and the number of previously failed access attempts by the user. It should be appreciated that other thresholds may be used and that embodiments are not necessarily limited to using minimum confidence scores.

At block 312, the confidence score calculated at block 306 is compared to the minimum confidence score identified at block 310. If the confidence score exceeds the minimum confidence score, then the specific service request interpreted at block 308 is initiated at block 314. For instance, if the voice information is interpreted to include the phrase "get directions to 333 Ravenswood Avenue in Menlo Park, Calif. from here" and the confidence score exceeds the minimum confidence score, then a command to retrieve directions as requested is sent to the appropriate application or service, which may be on the user device 120 and/or the server(s) 150, for processing. Process 300 then ends at block 316.

If the confidence score does not exceed the minimum confidence score, however, then at block 318 a determination is made whether to try and improve the confidence score with additional voice input or to end the process 300. If after two or more tries the confidence score still does not exceed the minimum confidence score, for example then process 300 may deem the user 110 to be an unauthorized user, determine that no additional tries will be permitted, and deny access to the specific service requested by proceeding to end at block 316. Otherwise, in some embodiments, at block 320 the user 110 may be prompted for additional voice input, such as shown in the examples of FIG. 4. The prompt may be a simple request, such as "please say again," or a more complex request, such as asking for additional information from the user 110 that is related to the specific service request, such as "what route do you prefer, fastest or shortest'?" in response to a request of "get directions." Other embodiments do not include block 320 or prompt. In these embodiments, process 300 may simply wait for the user 110 to speak again.

At block 322, an additional utterance, or second voice information, is received from the speaker. At block 324, the confidence score is updated by, for example, combining the additional utterance with one or more previously received utterances and comparing the combined utterances against the voice model. The updated confidence score is then compared with the minimum confidence score at block 312, as discussed above.

FIG. 4 is a chart depicting three examples of user interactions with systems and methods of verifying the identity of an authorized user as taught herein. In example 1 of FIG. 4, the user 110 says "get directions to 333 Ravenswood Avenue, Menlo Park, Calif. from here" and the confidence score calculated based on that service request exceeds the identified minimum confidence score for initiating that service request. Accordingly, the service request is initiated and the requested directions are provided. In example 2 of FIG. 4, the user 110 says the same thing but because the confidence score based on that service request does not exceed the minimum confidence score. Accordingly, the user is prompted to provide additional voice information related to the original service request. The prompt, in this example, is based on the initial request to "get directions," which permits a natural language conversation to occur in the course of obtaining not only further information related to the request but also further utterances for comparison with the voice model. In this example, a second utterance—"shortest traveling distance"—responsive to the prompt improves the confidence score to the point where it exceeds the minimum score. The user's request is therefore initiated, in accordance with all of the voice information provided by the user, and the requested directions are provided. Example 3 of FIG. 4 is similar to the example 2, except that the user is prompted for, and provides, two additional rounds of voice information before the confidence score exceeds the minimum.

Exemplary Computing Devices

Figure 5:
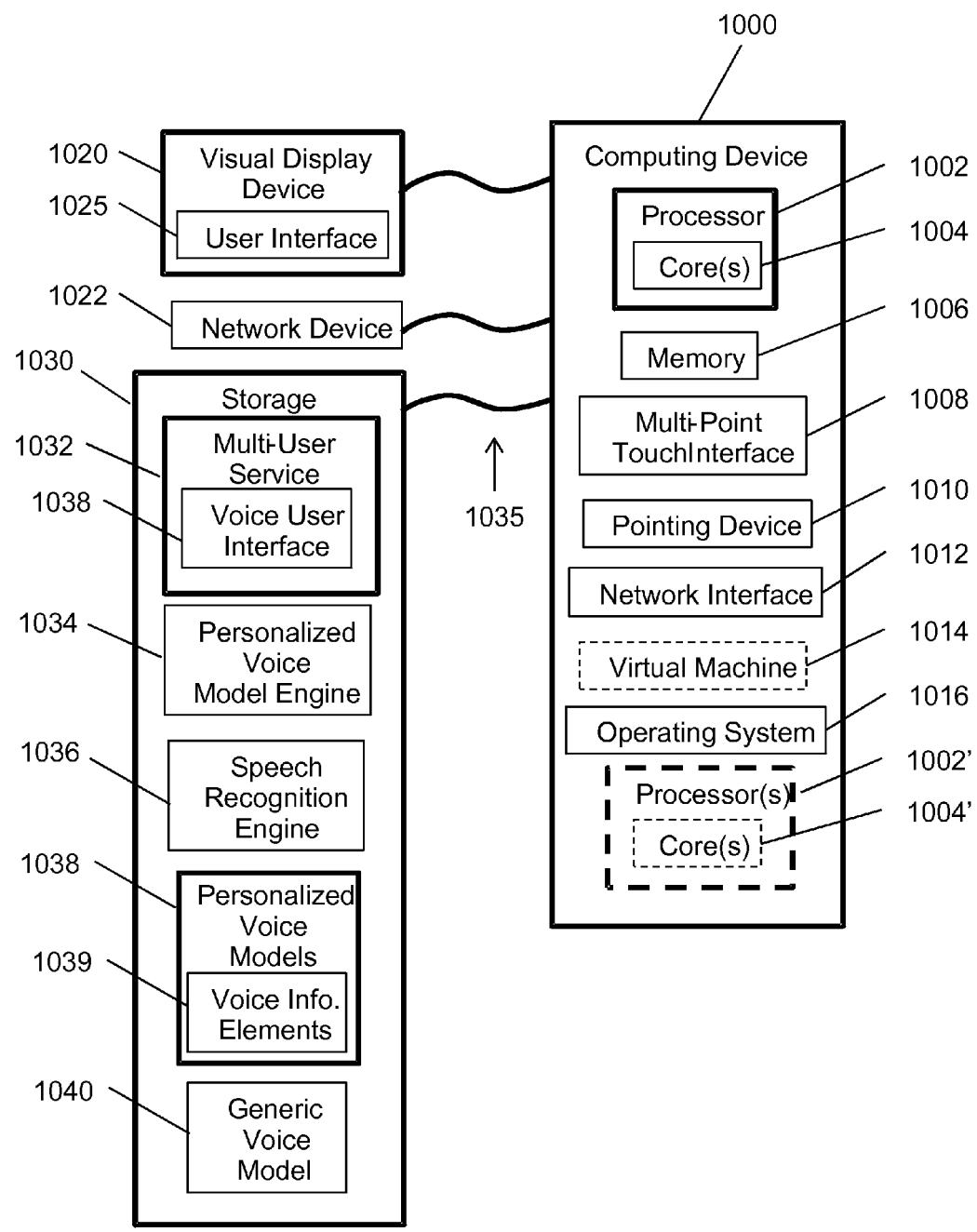
FIG. 5 is a block diagram of an exemplary computing device that may be used to perform any of the methods in the exemplary embodiments.

FIG. 5 is a block diagram of an exemplary computing device 1000 that may be used to perform any of the methods in the exemplary embodiments. The computing device 1000 may be any suitable computing or communication device or system, such as a mobile computing or communication device (e.g., the iPhone® mobile device by Apple), laptop, handheld computer, tablet computer (e.g., the iPad® tablet computer by Apple), or other form of computing or telecommunications device that is capable of communication and that has sufficient processor power and memory capacity to perform the operations described herein.

The computing device 1000 includes one or more non-transitory computer-readable media for storing one or more computer-executable instructions, programs or software for implementing exemplary embodiments. The non-transitory computer-readable media may include, but are not limited to, one or more types of hardware memory, non-transitory tangible media (for example, one or more magnetic storage disks, one or more optical disks, one or more USB flash drives), and the like. For example, memory 1006 included in the computing device 1000 may store computer-readable and computer-executable instructions, programs or software for implementing exemplary embodiments. Memory 1006 may include a computer system memory or random access memory, such as DRAM, SRAM, EDO RAM, and the like. Memory 1006 may include other types of memory as well, or combinations thereof.

The computing device 1000 also includes processor 1002 and associated core 1004, and optionally, one or more additional processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' may each be a single core processor or multiple core (1004 and 1004') processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

A user may interact with the computing device 1000 through a virtual display device 1020 and at least one associated user interface 1025. For example, virtual display device 1020 may include a visual display or a speaker. The associated user interface 1025 may be, for example, a pointing device (e.g., a mouse), multi-point touch interface, a touch-sensitive screen, a camera, or a microphone. As illustrated in FIG. 5, the presentation device 1020 may be linked to the associated user interface 1025. One example of a linked combination is a touch-sensitive screen that includes the user interface 1025 and the visual display presentation device 1020. The presentation device 1020 and the user interface 1025 may also have other uses. For example, a microphone 1021 and speaker 1022 on a mobile communication device may be used to make phone calls, receive voice input from the user and provide prompts to the user. As another example, the microphone can be used to input audible queries, information, and/or other voice information that can be processed by the computing device 1000 and/or can be processed by a device remote to, but in communication with, the computing device 1000. The presentation device 1020, however, need not be linked to the associated user interface 1025. For example, the computing device 1000 may include other input/output (I/O) devices for receiving input from a user, for example, a keyboard or any suitable multi-point touch interface 1008, a pointing device 1010, a microphone. The keyboard 1008 and the pointing device 1010 may be coupled to the presentation device 1020 and used as the user interface 1025. The computing device 1000 may include other suitable conventional I/O peripherals.

The computing device 1000 may include one or more storage devices 1030, such as a hard-drive, flash memory, or other computer readable media, for storing data and computer-readable instructions and/or software that implement portions of exemplary embodiments of a multi-user service 1032, a voice model personalization engine 1034, and a speech recognition engine 1036. In exemplary embodiments, the engines 1034 and/or 1036 can be integrated with the multi-user service 1032 or can be in communication with the multi-user service 1032. In exemplary embodiments, the multi-user service 1032 can implement a personalized voice user interface 1033 through which an audible interaction between an identified user and the multi-user service 1032 can occur. The one or more exemplary storage devices 1030 may also store one or more personalized voice models 1038, which may be include voice information elements 1039 generated and/or used by the engine 1034 to configured and/or program the engine 1036 associated with an embodiment of the multi-user service 1032. Additionally or alternatively, the one or more exemplary storage devices 1030 may store one or more default or generic voice models 1040, which may include voice information elements and may be used by the engines 1034 and/or 1036 as taught herein. For example, one or more of the generic voice models 1040 can be in conjunction with the personalized voice models 1036 and/or can be used as a basis for generating one or more of the personalized voice models by adding, deleting, or updating one or more voice information elements therein. Likewise, the personalized voice models can be modified by operation of an embodiment of the engine 1034 as taught herein or separately at any suitable time to add, delete, or update one or more voice information elements therein. In exemplary embodiments, the voice information elements can includes phonemes, words, phrases, and/or other verbal cues. The computing device 1000 may communication with the one or more storage devices 1030 via a bus 1035. The bus 1035 may include parallel and/or bit serial connections, and may be wired in either a multi-drop (electrical parallel) or daisy-chain topology, or connected by switched hubs, as in the case of USB.

The computing device 1000 may include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein.

The computing device 1000 may run any operating system 1016, such as any of the versions of the Microsoft® Windows® operating systems by Microsoft Corp. of Redmond, Wash., any version of the Unix and Linux operating systems, any version of the MacOS® operating system by Apple for Macintosh computers, any version of the Android® operating system by Google, Inc. of Mountain View, Calif., any embedded operating system, any real-time operating system, any open source operating system, any proprietary operating system, any operating systems for mobile computing devices, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Exemplary Network Environments

Figure 6:
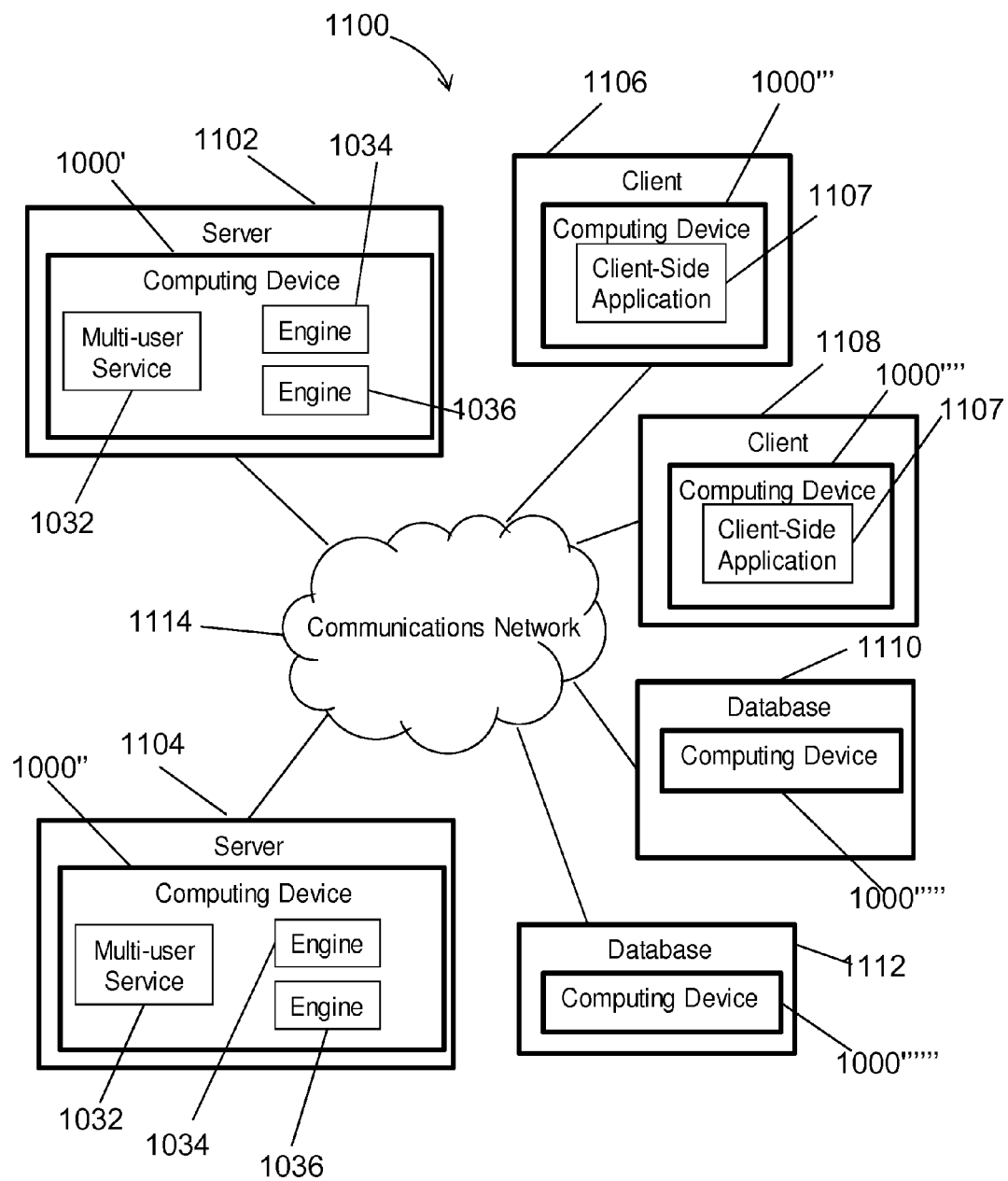
FIG. 6 is a block diagram of an exemplary network environment suitable for a distributed implementation of exemplary embodiments.

FIG. 6 is a block diagram of an exemplary network environment 1100 suitable for a distributed implementation of exemplary embodiments. The network environment 1100 may include one or more servers 1102 and 1104, one or more clients 1106 and 1108, and one or more databases 1110 and 1112, each of which can be communicatively coupled via a communication network 1114. The servers 1102 and 1104 may take the form of or include one or more computing devices 1000' and 1000", respectively, that are similar to the computing device 1000 illustrated in FIG. 5. The clients 1106 and 1108 may take the form of or include one or more computing devices 1000''' and 1000', respectively, that are similar to the computing device 1000 illustrated in FIG. 5. For example, clients 1106 and 1108 may include mobile user devices. Similarly, the databases 1110 and 1112 may take the form of or include one or more computing devices 1000'''' and 1000''''', respectively, that are similar to the computing device 1000 illustrated in FIG. 5. While databases 1110 and 1112 have been illustrated as devices that are separate from the servers 1102 and 1104, those skilled in the art will recognize that the databases 1110 and/or 1112 may be integrated with the servers 1102 and/or 1104 and/or the clients 1106 and 1108.

The network interface 1012 and the network device 1022 of the computing device 1000 enable the servers 1102 and 1104 to communicate with the clients 1106 and 1108 via the communication network 1114. The communication network 1114 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1114 are capable of supporting distributed implementations of exemplary embodiments.

In exemplary embodiments, one or more client-side applications 1107 may be installed on client 1106 and/or 1108 to allow users of client 1106 and/or 1108 to access and interact with a multi-user service 1032 installed on the servers 1102 and/or 1104. For example, the users of client 1106 and/or 1108 may include users associated with an authorized user group and authorized to access and interact with the multi-user service 1032. In some embodiments, the servers 1102 and 1104 may provide client 1106 and/or 1108 with the client-side applications 1107 under a particular condition, such as a license or use agreement. In some embodiments, client 1106 and/or 1108 may obtain the client-side applications 1107 independent of the servers 1102 and 1104. The client-side application 1107 can be computer-readable and/or computer-executable components or products, such as computer-readable and/or computer-executable components or products for presenting a user interface for a multi-user service. One example of a client-side application is a web browser that allows a user to navigate to one or more web pages hosted by the server 1102 and/or the server 1104, which may provide access to the multi-user service. Another example of a client-side application is a mobile application (e.g., a smart phone or tablet application) that can be installed on client 1106 and/or 1108 and can be configured and/or programmed to access a multi-user service implemented by the server 1102 and/or 1104 after the identity of the user is verified through a voice user interface of the client 1106 and 1108.

In an exemplary embodiment, client 1106 and/or 1108 may connect to the servers 1102 and/or 1104 (e.g., via the client-side application) to interact with a multi-user service 1032 on behalf of and/or under the direction of users. A voice user interface may be presented to the users by the client device 1106 and/or 1108 by the client-side application. In some embodiments, the server 1102 and/or 1104 can be configured and/or programmed to host the voice user interface and to serve the voice user interface to client 1106 and/or 1108. In some embodiments, the client-side application 1107 can be configured and/or programmed to include the voice user interface. In exemplary embodiments, the voice user interface enables users of client 1106 and/or 1108 to interact with the multi-user service using audible signals, e.g., utterances, such as speech, or other voice information received by a microphone at client 1106 and/or 1108.

In some embodiments, client 1106 can be used to initiate a service to be provided on client 1106. Similarly, client 1108 can be used to initiate a service to be provided on client 1108.

In some embodiments, client 1106 can be used to initiate a service to be provided on client 1108. In these embodiments, the user may provide client 1106 with voice information expressly requesting that the requested service be provided on client 1108. Alternatively, default user selections, stored for example on client 1106 or on a server 1102 or 1104, may identify client 1108 as the target of the requested service. Still alternatively, client 1108 may be identified as target for the requested service based on its functionality and its proximity to client 1106. In these embodiments, client 1108 may be a smart TV monitor/box, a smart navigation system, and/or a heads up display. As one example, voice information received through a voice user interface on 1106 may be interpreted as requesting that a movie be recorded on client 1108, which is a smart TV monitor/box. As another example, voice information received through a voice user interface on 1106 may be interpreted as requesting that a movie be purchased and played on smart TV monitor/box 1108. In either of the foregoing examples, if the confidence score calculated from the voice information exceeds the minimum confidence score for initiating the specific service request, the service request is initiated.

In an exemplary embodiment, the server 1102 and/or the server 1104 can be configured and/or programmed with the voice model personalization engine 1034 and/or the speech recognition engine 1036, which may be integrated with the multi-user service 1032 or may be in communication with the multi-user service 1032 such that the system can be associated with the multi-user service 1032. The engine 1034 can be programmed to generate a personalized voice model for users of the multi-user service based on at least an identity of the user. In some embodiments, the multi-user service and/or the system can be implemented by a single server (e.g. server 1102). In some embodiments, an implementation of the multi-user service and/or the system can be distributed between two or more servers (e.g., servers 1102 and 1104) such that each server implements a portion or component of the multi-user service and/or a portion or component of the system.

The databases 1110 and 1112 can store user information, previously generated personalized voice models, generic voice models, and/or any other information suitable for use by the multi-user service and/or the personalized voice model engine. The servers 1102 and 1104 can be programmed to generate queries for the databases 1110 and 1112 and to receive responses to the queries, which may include information stored by the databases 1110 and 1112.

Having thus described several exemplary embodiments of the invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A computer-implemented method of verifying the identity of a speaker as an authorized user in an authorized user group to a level necessary for enabling secure access to one or more services via a device, the method comprising:

receiving first voice information comprising a specific service request from a speaker through the device before verifying the identity of the speaker as an authorized user;

calculating, by at least one processor, a confidence score that the speaker is an authorized user based on a comparison of the first voice information comprising the specific service request received before verifying the identity of the speaker as an authorized user with a stored voice model associated with the authorized user group and specific to the authorized user, wherein the at least one processor is included in at least one of the device and a server operatively coupled to the device through a communication network;

interpreting, by the at least one processor, the first voice information as a specific service request;

identifying, by the at least one processor, a type of service request comprising the specific service request;

identifying, by the at least one processor, a minimum confidence score for initiating the type of service request comprising the specific service request;

determining, by the at least one processor, whether or not the confidence score exceeds the minimum confidence score; and if the confidence score exceeds the minimum confidence score, initiating the specific service request;

if the confidence score does not exceed the minimum confidence score, obtaining second voice information concerning the specific service request from the speaker through the device;

calculating a confidence score based on a comparison of a combination of the first voice information comprising the specific service request and the second voice information concerning the specific service request with the stored voice model associated with the authorized user group and specific to the authorized user; and repeating the determining step.

2. The computer-implemented method of claim 1, further comprising constructing, by the at least one processor, the stored voice model based on voice information representing a set of service requests spoken by the speaker prior to receiving the first voice information.

3. The computer-implemented method of claim 2, further comprising updating, by the at least one processor, the stored voice model based on the first voice information.

4. The computer-implemented method of claim 1, further comprising storing, in the device, a plurality of minimum confidence scores each corresponding to a type of service request.

5. The computer-implemented method of claim 1, further comprising prompting the speaker for the second voice information if the confidence score does not exceed the minimum confidence score.

6. The computer-implemented method of claim 5, wherein prompting the speaker for the second voice information includes prompting the speaker to speak specific words based on the specific service request.

7. The computer-implemented method of claim 5, wherein prompting the speaker for the second voice information includes:
looking up, in a database, options related to fulfillment of a type of service corresponding to the specific service request; and
constructing, by the at least one processor, the prompt based on at least one of the options.

8. The computer-implemented method of claim 1, further comprising denying access if the confidence score does not exceed the minimum confidence score subsequent to receiving a predetermined amount of voice information from the speaker.

9. The computer-implemented method of claim 1, further comprising interpreting, by the at least one processor, the second voice information as additional information related to the specific service request.

10. A system for verifying the identity of a speaker as an authorized user in an authorized user group to a level necessary for enabling secure access to one or more services via a device, the system comprising:

at least one processor included in at least one of the device and a server operatively coupled to the device through a communication network, the device configured to receive voice information from a speaker; and a memory operatively coupled to the at least one processor, the memory including computer-executable instructions that when executed by the at least one processor cause the at least one processor to:

receive first voice information comprising a specific service request from a speaker through the device before verifying the identity of the speaker as an authorized user;

calculate a confidence score based on a comparison of the first voice information comprising the specific service request received before verifying the identity of the speaker as an authorized user with a stored voice model associated with the authorized user group and specific to the authorized user;

interpret the first voice information as a specific service request;

identify, by the at least one processor, a type of service request comprising the specific service request;

identify a minimum confidence score for initiating the type of service request comprising the specific service request;

determine whether or not the confidence score exceeds the minimum confidence score; and if the confidence score exceeds the minimum confidence score, initiate the specific service request;

if the confidence score does not exceed the minimum confidence score, obtain second voice information concerning the specific service request from the speaker through the device; calculate a confidence score based on a comparison of a combination of the first voice information comprising the specific service request and the second voice information concerning the specific service request with the stored voice model associated with the authorized user group and specific to the authorized user; and repeat the determining step.

11. The system of claim 10, wherein the memory further includes computer-executable instructions that when executed by the at least one processor cause the at least one processor to construct the stored voice model based on voice information representing a set of service requests spoken by the speaker prior to receiving the first voice information.

12. The system of claim 11, wherein the memory further includes computer-executable instructions that when executed by the at least one processor cause the at least one processor to update the stored voice model based on the first voice information.

13. The system of claim 10, wherein the memory further includes computer-executable instructions that when executed by the at least one processor cause the at least one processor to prompt the speaker for the second voice information if the confidence score does not exceed the minimum confidence score.

14. The system of claim 10, wherein the memory further includes computer-executable instructions that when executed by the at least one processor cause the at least one processor to interpret the second voice information as additional information related to the specific service request.

15. A non-transitory computer-readable medium having stored thereon computer-executable instructions that when executed by at least one processor cause the at least one processor to:
- receive first voice information comprising a specific service request from a speaker through a device before verifying the identity of the speaker as an authorized user;
- calculate a confidence score that the speaker is an authorized user based on a comparison of the first voice information comprising a specific service request received before verifying the identity of the speaker as an authorized user with a stored voice model associated with an authorized user group and specific to an authorized user in the authorized user group;
- interpret the first voice information as a specific service request;
- identify, by the at least one processor, a type of service request comprising the specific service request;
- identify a minimum confidence score for initiating the type of service request comprising the specific service request;
- determine whether or not the confidence score exceeds the minimum confidence score; and
- if the confidence score exceeds the minimum confidence score, initiate the specific service request;
- if the confidence score does not exceed the minimum confidence score, obtain second voice information concerning the specific service request from the speaker through the device;
- calculate a confidence score based on a comparison of a combination of the first voice information comprising the specific service request and the second voice information concerning the specific service request with the stored voice model associated with the authorized user group and specific to the authorized user; and repeat the determining step.

16. The non-transitory computer-readable medium of claim 15, further comprising computer-executable instructions that when executed by the at least one processor cause the at least one processor to:
- construct the stored voice model based on voice information representing a set of service requests spoken by the speaker prior to receiving the first voice information; and
- update the stored voice model based on the first voice information.

17. The non-transitory computer-readable medium of claim 15, further comprising computer-executable instructions that when executed by the at least one processor cause the at least one processor to prompt the speaker for the second voice information if the confidence score does not exceed the minimum confidence score.

18. The non-transitory computer-readable medium of claim 15, further comprising computer-executable instructions that when executed by the at least one processor cause the at least one processor to interpret the second voice information as additional information related to the specific service request.

* * * * *